United States Patent [19]

Castillo

[11] Patent Number: 4,745,685

[45] Date of Patent: May 24, 1988

[54] MOVABLE JAW MEASURING APPARATUS

[76] Inventor: David D. Castillo, 3808 S. 12th St., Phoenix, Ariz. 85040

[21] Appl. No.: 83,278

[22] Filed: Aug. 10, 1987

[51] Int. Cl.⁴ ............................ G01B 5/16; G01B 3/20
[52] U.S. Cl. .................................. 33/199 R; 33/143 M
[58] Field of Search ........... 33/143 R, 143 M, 147 M, 33/199 R

[56] References Cited

U.S. PATENT DOCUMENTS

| | | | |
|---|---|---|---|
| 1,287,040 | 12/1918 | Junker | 33/143 M |
| 2,528,431 | 10/1950 | Greenberg | 33/199 R |
| 2,694,262 | 11/1954 | Daniel | 33/143 M |
| 3,396,472 | 8/1968 | Moss | 33/199 R |
| 3,503,131 | 3/1970 | Warner | 33/143 M |
| 4,058,900 | 11/1977 | Yandell | 33/199 R |
| 4,677,751 | 7/1987 | Masseth | 33/199 R |

OTHER PUBLICATIONS

*Popular Science,* "20-in-1 Shopguide", 1966, 2 pgs.

*Primary Examiner*—Richard R. Stearns
*Attorney, Agent, or Firm*—H. Gordon Shields

[57] ABSTRACT

Movable jaw measuring apparatus usable for measuring widths across the flats of bolts includes a fixed jaw and a movable jaw, and reference marks for indicating the measurements may be in both inch and metric units. The movable jaws can also be used to measure the diameter of the bolts. Apparatus includes linear measurement indicia for measuring the length of various elements, also in both inch and metric units, if desired. Peripheral surfaces may include serrations for measuring the pitch of threads, or thread measuring indicia may be printed on surfaces.

12 Claims, 1 Drawing Sheet

MOVABLE JAW MEASURING APPARATUS

BACKGROUND OF THE INVENTION

1. Field of the Invention

This invention relates to the measurement of nuts and bolts, and, more particularly, to the length, diameter, and pitch of threaded fasteners, including both the nuts and bolts.

2. Description of the Prior Art

Typically, the prior art involves several different elements. For example, a simple ruler may be used to measure the distance across the flats of a head of a bolt, and a simple ruler may also be used to measure the length of a bolt. A simple ruler may also be used to measure the diameter of a bolt, but the diameter measurements must be carefully made due to the inherent problems associated with threads, etc.

Also, there have been paper (cardboard) or plastic templates made with individual measuring elements incorporated for measuring bolt head sizes, bolt diameters, etc. Such features generally include a plurality of apertures of different diameters, appropriately sized for the various diameters of bolts. In addition, provisions are also made for measuring the length of the bolts.

For measuring the number of threads per inch, a plurality of separate gauges is generally required. The plurality of gauges comprises a number of individual gauges each of which includes a different thread size.

To carry around several different elements, such as discussed above, is generally impractical. The inclusion of a single tool capable of measuring thread sizes as well as bolt lengths and head diameters has not been incorporated into a single element that is able to measure with precision. The apparatus of the present invention overcomes the prior art deficiencies and provides a single tool with the capability of measuring a plurality of different measurements concerning nuts and bolts. Moreover, the apparatus of the present invention is easily carried by an individual and accordingly is always available without having to resort to a remote location at which one or more of the prior art tools may be kept.

SUMMARY OF THE INVENTION

The invention described and claimed herein comprises movable jaw measuring apparatus for measuring the diameter of bolts, the distance across bolt heads, or parallel wrench flats, and the length of bolts. Gauges are contained on the periphery of the measuring apparatus for determining thread pitch for course, fine, and metric threads.

Among the objects of the present invention are the following:

To provide new and useful measuring apparatus;

To provide new and useful apparatus for measuring bolts and nuts;

To provide new and useful measuring apparatus having a movable jaw;

To provide new and useful measuring apparatus for measuring the pitch of threads;

To provide new and useful apparatus for measuring various dimensions on bolts and nuts and which is easily carried by an individual user; and To provide new and useful measuring apparatus providing both metric measuring units and English measuring units on the same apparatus.

DESCRIPTION OF THE PREFERRED EMBODIMENT

Figure 1:
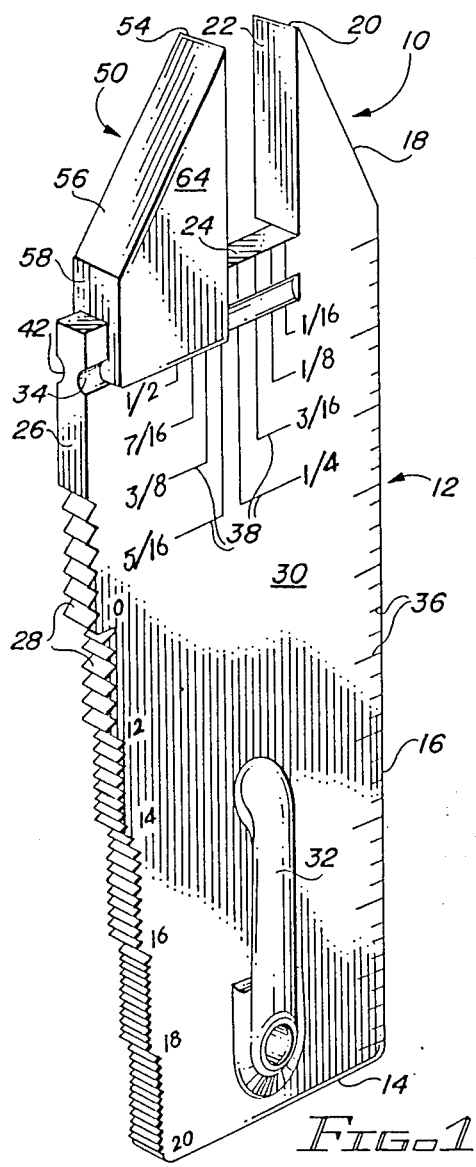
FIG. 1 is a perspective view of the apparatus of the present invention.
Figure 2:
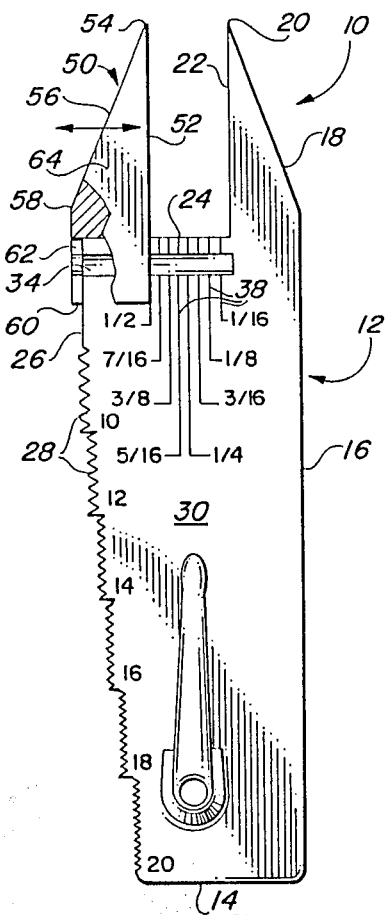
FIG. 2 is a plan view of the apparatus of the present invention.
Figure 3:
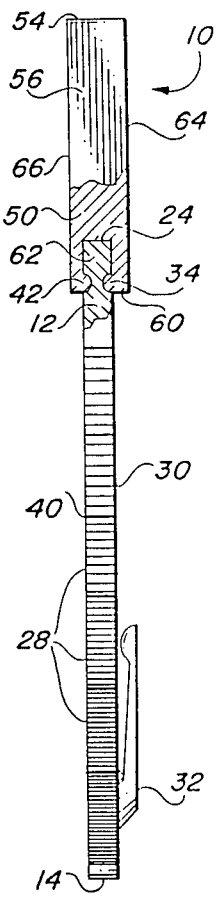
FIG. 3 is a side view of the apparatus of the present invention.

FIG. 1 is a perspective view of movable jaw measuring apparatus 10 of the present invention. The movable jaw measuring apparatus 10 includes a fixed base 12, and the base is generally of an elongated, generally rectangular, configuration. The generally rectangular configuration is best shown in FIG. 2. FIG. 2 comprises a plan view of the movable jaw measuring apparatus 10. FIG. 3 is a side view of the measuring apparatus 10.

The movable jaw measuring apparatus 10 includes two primary portions, the fixed base portion 12 and a movable jaw portion 50. The base 12 includes a lower edge 14 and a side edge 16 which is substantially perpendicular to the lower edge 14. The side edge 16 is straight and elongated. At the upper portion of the side edge 16, remote from the bottom edge 14, is an angled edge 18. The angled edge 18, remote from the side edge 16, terminates in a point 20. The edge 18 is an angled or slanted face for a fixed jaw.

Extending downwardly from the point 20 there is an inside edge 22. The inside edge 22 comprises an inner, fixed face for measuring distances in conjunction with the movable jaw 50. At the bottom or lower portion of the inside edge or face 22 is a bottom edge 24. The bottom edge 24 is substantially perpendicular to the inside edge 22.

The bottom edge 24 extends outwardly, or away from the inside edge 22, to an outer, side edge 26. The side edge 26 extends downwardly to the bottom or lower edge 14.

As shown in FIGS. 1 and 2, the side edge 26 includes a plurality of indentations or series of indentations in steps. The length of each series of indentations corresponds to a desired predetermined length having a plurality of indentations or serrations 28 which comprise thread indicia. There are numerals adjacent to each series of thread indicia to indicate in arabic numerals the number of threads per inch corresponding to each particular thread indicia 28.

The measuring apparatus 10 includes two planar surfaces, a top planar surface 30 and a bottom or rear planar surface 40. Both surfaces are shown in FIG. 3. The surfaces 30 and 40 are generally parallel to each other.

The top planar surface 30 includes a clip 32 for conveniently securing the measuring apparatus 10 to a user's pocket. The top planar surface 30 also includes a groove 34 adjacent and parallel to the bottom edge 24 of the jaw. As best shown in FIG. 3, the bottom or rear planar surface 40 includes a groove 42 which is generally parallel to the groove 34. The grooves 34 and 42 extend inwardly from the side edge 26 and terminate at about a location generally aligned with the inside edge or face 22. This is shown in FIGS. 1 and 2 for the groove 34.

As best shown in FIG. 1, the top planar surface 30 includes measuring indicia 36 adjacent to the straight side edge 16. The top planar surface 30 also includes measuring indicia 38. The measuring indicia 38 include lines extending downwardly from the bottom edge 24 and indicate distances from the face 22.

The movable jaw 50 includes an inside edge or face 52 which is disposed generally parallel to the inside edge or face 22 of the fixed jaw. The inside edge or face 52 extends downwardly from a point 54. When the apparatus is assembled, as shown in FIGS. 1, 2, and 3, the point 54 is generally parallel to and aligned with the point 20 of the base 12.

Extending downwardly and outwardly from the point 54 is a slanted or angled outside jaw edge 56. The slanted or angled edge 56 is generally aligned in overall length with the angled outside edge 18 of the base 12. The slanted jaw edge 56 extends downwardly to an outside jaw edge 58. The outside edge 58 extends downwardly, generally parallel to the outside edge 16 of the base 12, to a bottom or lower edge 60. The bottom edge 60 of the movable jaw 50 is generally parallel to the lower or bottom edge 14 of the base 12.

The movable jaw 50 includes a slot 62 which extends upwardly from the bottom or lower edge 60. The slot 62 is configured to fit into the grooves 34 and 42 and against the edge or surface 24. The edge or surface 24 comprises the bottom of the jaw of the measuring apparatus 10. The movable jaw essentially moves in the grooves 34 and 42 and on the edge 24 to provide relative movement between the movable jaw 50 and the base 12. As best shown in FIG. 2, the faces 22 and 52 are generally parallel to each other. The face 52 extends the full height or length of the jaw 50, and thus intersects the various measuring indicia 38. The location of the face 22 with respect to the indicia 38 indicates the distance between, or the width of the fixed and movable jaws, or the distance between the surfaces or edges 22 and 52.

Obviously, the surfaces 22 and 52 are placed over an element to be measured, and the distance between the faces, with respect to the indicia 38, indicates the width of element or the the distance being measured.

The movable jaw 50 includes two generally flat or planar surfaces, including a flat, front side or planar surface 64 and a rear, flat, generally planar rear surface 66. The surfaces 64 and 66 are both shown in FIG. 3. The surface 64 is also shown in FIGS. 1 and 2.

From the above description, and by reference to FIGS. 1, 2, and 3, it will be noted that the movable jaw measuring apparatus 10 is able to measure several different types of distances, such as linear distance by the indicia 36, the pitch of threads by the thread indicia 28, and distances, such as across wrench flats, or diameters, etc., between the faces 22 and 52. It will also be noted that the distances between the points 20 and 54 corresponds to the distances between the faces 22 and 52.

It will obviously be noted that the measuring indicia 36 and 38, and the thread indicia 28, may be given in English units or in Metric units, or in both units, as desired. If desired, measuring indicia 36 and 38 on the side 30 of the measuring apparatus 10 may be in English units, and on the side 40, corresponding distance or measuring indicia may be in Metric units. Due to the complexity of the threads, preferably only a single thread type may be shown on the side 26. However, if desired, the lower edge 14, and the edges 18 and 56 may includes thread indicia in different units. Thus, both English and Metric units may be provided on a single measuring device.

Figure 4:
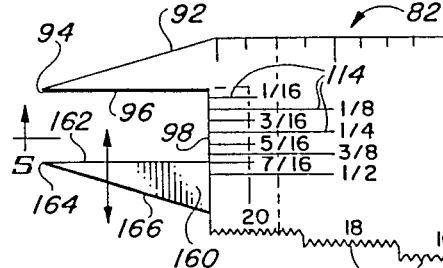
FIG. 4 is a plan view of an alternate embodiment of the apparatus of the present invention.

FIG. 4 is a plan view of an alternate embodiment of the apparatus shown in FIGS. 1–3, comprising alternate measuring apparatus 80. The alternate measuring apparatus 80 includes two movable jaws, one at each end.

Figure 5:
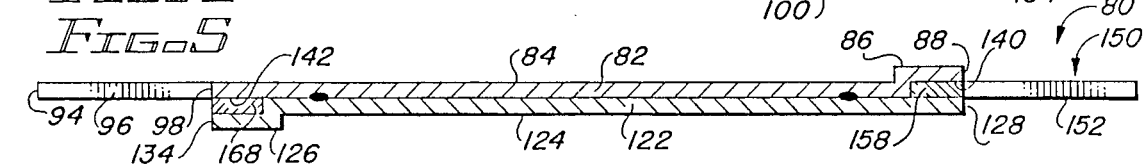
FIG. 5 is a view in partial section taken generally along line 5—5 of FIG. 4.

FIG. 5 is a view in partial section of the double movable jaw measuring apparatus 80, taken generally along line 5—5 of FIG. 4. For the following discussion, reference will primarily be made to FIGS. 4 and 5.

The alternate embodiment, comprising double movable jaw apparatus 80, includes two plates, a top plate 82 and a bottom plate 122. The top plate 82 includes a flat portion 84 and a raised boss portion 86. The raised boss portion 86 includes a lower or bottom jaw edge 88. The lower jaw edge 88 is substantially perpendicular to a flat side edge 90. Remote from the lower bottom jaw edge 88 and from the raised boss portion 86, an angled upper edge 92 extends from the flat side edge 90. The angled upper edge 92 extends to a point 94. An inside edge or face 96 extends inwardly from the point 94 to a jaw edge 98. The edges 96 and 98 are substantially perpendicular to each other.

A thread edge 100 extends downwardly from the outer termination of the jaw edge 98. The thread edge 100 includes a serrated portion which is stepped in accordance with a plurality of individual thread serrations, comprising thread indicia 116.

From the bottom of the thread edge 106, there is an upwardly and inwardly extending angled lower edge 102. The edge 102 extends to a point 104. From the point 104, there is a lower inside edge or face 106 that extends to the jaw edge 88. The edges 88 and 106 are substantially perpendicular to each other.

Along the edge 88 is a plurality of lower jaw measuring indicia 110. A plurality of linear measuring indicia 112 is disposed along the edge 90. Along the upper jaw edge 96 is a plurality of upper jaw measuring indicia 114.

The measuring indicia 110, the linear measuring indicia 112, and the measuring indicia 114, as well as specific thread numerals relating to the thread indicia 116, are disposed on the flat portion 84 of the top plate 82. The indicia 110 are also disposed on the boss 86. The indicia 110 and 114 extend from their respective jaw edges 88 and 98, respectively.

The bottom plate 122 includes a flat planar portion 124 and a raised boss portion 126. The raised boss portion 126 is remote from the raised boss portion 86 of the upper plate 82, in addition to being on the opposite side of the apparatus 80 from the boss 86.

The bottom plate 122 includes a lower edge 128 which is substantially parallel to the lower edge 88 of the top plate 82. The bottom plate 122 also includes a generally flat or straight side edge, not shown, but which is generally parallel to the edge 90 of the top plate 82. The lower or bottom plate 122 also includes a thread edge, not shown, which is substantially parallel to the thread edge 100 of the plate 82 and which is essentially an aligned continuation of the edge 100.

The plate 122 also includes an upper jaw edge 134, which is substantially parallel to the edge 98 of the plate 82.

A pair of slots are disposed at opposite ends of the measuring apparatus 80. A lower slot 140 is disposed between the raised portion 86 of the upper plate 82 and the lower plate 124. An upper slot 142 is disposed between the raised boss portion 126 of the lower plate 122 and the upper plate 82.

Within the slot 140 there is disposed a lower movable jaw 150. The lower movable jaw 150 includes an inside face or edge 152 which is generally parallel to the inside face or edge 106 of the top plate 82. The inside face or edge 152 extends from the slot 140 outwardly to a point 154. From the point 154, an outside slanted edge 156 extends to a base portion 158. The base portion 158 is disposed in the slot 140.

Within the slot 142 is an upper movable jaw 160. The upper movable jaw 160 includes an inside face or edge 162 which is generally parallel to the inside edge or face 96 of the plate 82. The inside face 162 extends from the edge 98 outwardly to a point 164. From the point 164, an outside slanted edge 166 extends to a base portion 168. The base portion 168 is disposed within the slot 142.

The faces 106 and 152 are substantially the same length, and the points 104 and 154 are accordingly aligned. Similarly, the faces 96 and 162 are of substantially the same length, and the points 94 and 164 are accordingly substantially aligned. The movable jaws 150 and 160 move in their respective slots back and forth for the measurement of the inside distances between the faces 106, 152 and 96, 162, respectively. The adjacent respective indicia 110 and 114 are used in conjunction with the inside edges or faces 152 and 162, respectively, to indicate the width between the inside faces of the movable jaws.

The jaws 150 and 160 are movable in their respective slots 140 and 142 for measuring various distances. In FIG. 4, the bottom or lower movable jaw 150 is substantially wider than the upper movable jaw 160, and accordingly the upper, movable jaw 160 may be used to measure relatively smaller distances, while the lower movable jaw 150 may be used to measure relatively greater distances. It will be noted, of course, that the width between the edge 90 and the edge 100 at the lower portion of the measuring apparatus 80 is substantially greater than the distance between the edge 90 and the edge 100 at the upper jaw 160. The reason is, of course, as shown in FIG. 4, that the threaded portion of the thread edge 100 is in a stepped arrangement for allowing a plurality of different thread dimensions to be located along the edge 100.

As is indicated in FIG. 5, the plates 82 and 122 may be appropriately secured together, as by solvent welding, or the like, to provide a unitary measuring apparatus with only the jaws 150 and 160 being movable in their respective slots 140 and 142.

It will be noted that English units are illustrated as being inscribed or marked on the upper side 84 of the measuring apparatus 80. The opposite side, the side 124, may include Metric indicia, if desired. However, it may be impractical to have different thread sizes on opposite sides, even though the upper plate 82 may include English thread sizes, while the lower side 124 may include Metric measurements which correspond roughly to the English measurements. However, a different type of thread measuring may be utilized, in which case the thread edge would be a relatively straight, but perhaps angled edge, with appropriate thread information simply marked inwardly from the edge. Such an arrangement is illustrated in FIG. 6.

Figure 6:
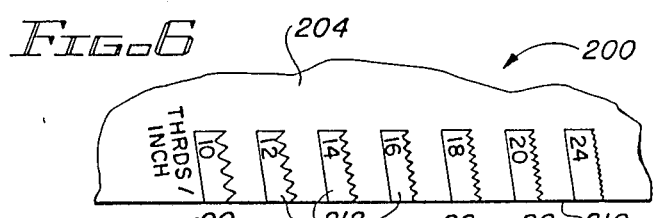
FIG. 6 is a fragmentary plan view of a portion of an alternate embodiment of the apparatus of the present invention.

FIG. 6 is a fragmentary view of an alternate embodiment of the movable jaw measuring apparatus, comprising a portion of measuring apparatus 200. The apparatus 200, as illustrated in FIG. 6, includes a flat portion 204, and a thread edge 210. Extending inwardly from the thread edge 200 on the flat portion 204 is a plurality of thread indicia 212. The thread indicia 212 are printed or otherwise disposed on the flat portion 204 inwardly from the thread edge 210 and are in full scale. For determining thread size, a threaded element is disposed on the surface 204 and against or adjacent to the thread indicia 212, where comparisons are made until the threads appropriately line up. In this manner, thread size is determined.

While the printed type of thread indicia 212 may not be as easy to work with or as fast to work with as the serrated indicia 116 shown in FIG. 4 or thread indicia 28 shown in FIGS. 1 and 2, the printed type thread indicia 212 may offer substantial advantages in manufacturing and in the case of providing both English thread sizes and Metric thread sizes on a single measuring instrument. Moreover, the overall length of the thread indicia 212 is substantially less than the overall length of the thread indicia 28 and 116, discussed above, because the thread indicia 212 extend inwardly from the edge 210, while the thread indicia 28 and 116 extend along the their respective edges in stepped serrations.

Finally, with respect to economics involved, the cost of printing the thread indicia 212 may more than offset the cost of the molds required for the serrated thread indicia 28 and 116. Also, having two smooth edges has advantages in carrying the apparatus in one's pocket, where the serrations are liable to catch or snag cloth, threads, etc.

It will be noted that the jaws in the measuring apparatus 10 and 80 all include points. As mentioned, the points may be advantageous in measuring diameters under certain circumstances. However, it may be advantageous to have rounded corners for convenience in carrying the apparatus in pockets and for safety purposes. Accordingly, if desired, the jaw elements, both the fixed elements and the movable elements, may include rounded corners or squared corners, as desired, such as are shown in FIGS. 7A and 7B.

Figure 7A:
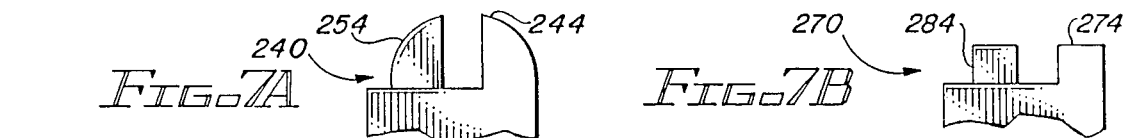
FIG. 7A is a fragmentary view of a portion of an alternate embodiment of the apparatus of the present invention.
Figure 7B:
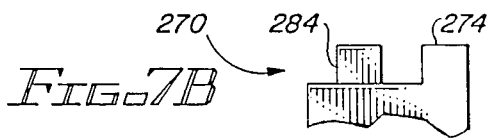
FIG. 7B is a fragmentary view of a portion of an alternate embodiment of the apparatus of FIG. 7A.

FIGS. 7A and 7B are fragmentary views of portions of alternate embodiments of the apparatus of the present invention. In FIG. 7A, movable jaw apparatus 240 is shown with a round corner 244 on a fixed jaw portion of the measuring apparatus 240, and a rounded corner or point 254 on a movable jaw. In FIG. 7B, measuring apparatus 270 is shown with a square fixed jaw 274 and a square movable jaw 284. The rounded corners and the square corners may have advantages under certain circumstances, as mentioned above.

It will be noted that the three dimensional thread indicia 28 and 116, as well as the two dimensional thread indicia 212, may be used with single jaw measuring apparatus or with the dual jaw measuring apparatus. Moreover, the employment of the pointed jaws, the rounded jaws or the square jaws, with respect to the single or double jaw or the two dimensional or three dimensional thread indicia, is virtually immaterial. The different combinations would depend entirely upon the ultimate apparatus desired. Similarly, the manner in which a movable jaw is secured to a particular base or plate is relatively immaterial.

While the principles of the invention have been made clear in illustrative embodiments, there will be immediately obvious to those skilled in the art many modifications of structure, arrangement, proportions, the elements, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Movable jaw measuring apparatus for measuring nuts and bolts, comprising, in combination:
   plate means, including
      a relatively flat portion,
      a straight edge on the relatively flat portion,
      first measuring indicia along the straight edge,
      a thread edge, and
      thread measuring means along the thread edge for measuring the pitch of threads;
   fixed jaw means secured to the plate means, including
      a first inside jaw face,
      a first bottom jaw edge, and
      second measuring indicia adjacent to the first bottom jaw edge; and
   movable jaw means movably secured to the plate means, including a second inside jaw face disposed substantially parallel to the first inside jaw face and movable along the second measuring indicia to measure elements placed between the first and second inside jaw faces.

2. The apparatus of claim 1 in which the plate means further includes a first surface and a second surface, and each surface includes measuring indicia.

3. The apparatus of claim 1 in which the plate means further includes a first end and a second end, and the fixed jaw means includes a first fixed jaw at the first end, and the movable jaw means includes a first movable jaw at the first end.

4. The apparatus of claim 3 in which the fixed jaw means further includes a second fixed jaw at the second end, and the movable jaw means further includes a second movable jaw at the second end.

5. The apparatus of claim 1 in which the fixed jaw means further includes a first fixed jaw and a second fixed jaw, and the movable jaw means further includes a first movable jaw movable relative to the first fixed jaw and a second movable jaw movable relative to the second fixed jaw.

6. The apparatus of claim 1 in which the thread measuring means includes a plurality of serrations along the thread edge corresponding to thread pitch.

7. The apparatus of claim 6 in which the plurality of serrations includes a plurality of steps, and each step includes a plurality of serrations corresponding to a thread pitch, with the plurality of steps accordingly comprising a plurality of thread pitches.

8. The apparatus of claim 1 in which the thread measuring means includes a plurality of thread indicis extending inwardly on the plate means from the thread edge, representing a plurality of thread pitches.

9. The apparatus of claim 8 in which the thread indicia comprise two dimensional representations of thread pitches.

10. The apparatus of claim 1 in which the fixed jaw means and the movable jaw means each include a point, and the points are aligned with each other for measuring inside diameters.

11. The apparatus of claim 1 in which the fixed jaw means and the movable jaw means each include a rounded portion for convenience in carrying the measuring apparatus.

12. The apparatus of claim 1 in which the plate means further includes clip means for securing the measuring apparatus to a pocket.

* * * * *